United States Patent [19]

Scharpenberg et al.

[11] Patent Number: 4,847,036
[45] Date of Patent: Jul. 11, 1989

[54] APPARATUS FOR THE INSPECTION OF A NUCLEAR REACTOR FUEL ASSEMBLY

[75] Inventors: Rainer Scharpenberg, Wald-Michelbach; Hermann-Josef Heckhausen, Weinheim, both of Fed. Rep. of Germany

[73] Assignee: Brown Boveri Reaktor GmbH, Mannheim, Fed. Rep. of Germany

[21] Appl. No.: 99,149

[22] Filed: Sep. 18, 1987

[30] Foreign Application Priority Data

Sep. 20, 1986 [DE] Fed. Rep. of Germany ....... 3632061

[51] Int. Cl.$^4$ ............................................. G21C 17/00
[52] U.S. Cl. .................... 376/245; 376/252; 376/260; 73/622; 73/625
[58] Field of Search ............... 376/245, 249, 252, 260, 376/261; 73/641, 628, 625, 623, 622

[56] References Cited

U.S. PATENT DOCUMENTS

| 3,373,602 | 3/1968 | Wendt et al. | 73/622 |
|---|---|---|---|
| 3,375,706 | 4/1968 | Pandelis et al. | 73/622 |
| 4,193,843 | 3/1980 | Womack et al. | |
| 4,483,192 | 11/1984 | Wachter | 376/245 |
| 4,517,152 | 5/1985 | Pieper et al. | 376/252 |
| 4,637,912 | 1/1987 | Scharpenberg et al. | 376/245 |
| 4,655,993 | 4/1987 | Scharpenberg | 376/245 |
| 4,657,728 | 4/1987 | Coppa et al. | 376/249 |
| 4,683,104 | 7/1987 | Scharpenberg | 376/245 |

FOREIGN PATENT DOCUMENTS

| 3337084 | 4/1985 | Fed. Rep. of Germany . | |
| 3417742 | 11/1985 | Fed. Rep. of Germany | 376/260 |
| 3419765 | 11/1985 | Fed. Rep. of Germany . | |
| 0047093 | 4/1979 | Japan | 376/252 |

Primary Examiner—Harvey E. Behrend
Attorney, Agent, or Firm—Herbert L. Lerner; Laurence A. Greenberg

[57] ABSTRACT

An apparatus for the inspection of a nuclear reactor fuel assembly in a water-filled pool having fuel rods with spaces therebetween includes an encapsulated housing having walls and being disposed in the water-filled pool. A lever drive mechanism is disposed in the housing. A rotary transmission connected to the lever drive mechanism extends through one of the walls of the housing toward the surface of water in the pool. A plurality of stationarily disposed lever linkages jut out from the rotary transmission outside the housing. Each of the lever linkages has an end facing away from the rotary transmission. Carriers are each connected to a respective one of the ends of the lever linkages. Probes are each disposed on a respective one of the carriers. Ultrasonic test heads are each disposed on a respective one of the probes for insertion into the spaces between the fuel rods.

2 Claims, 1 Drawing Sheet

U.S. Patent
Jul. 11, 1989
4,847,036
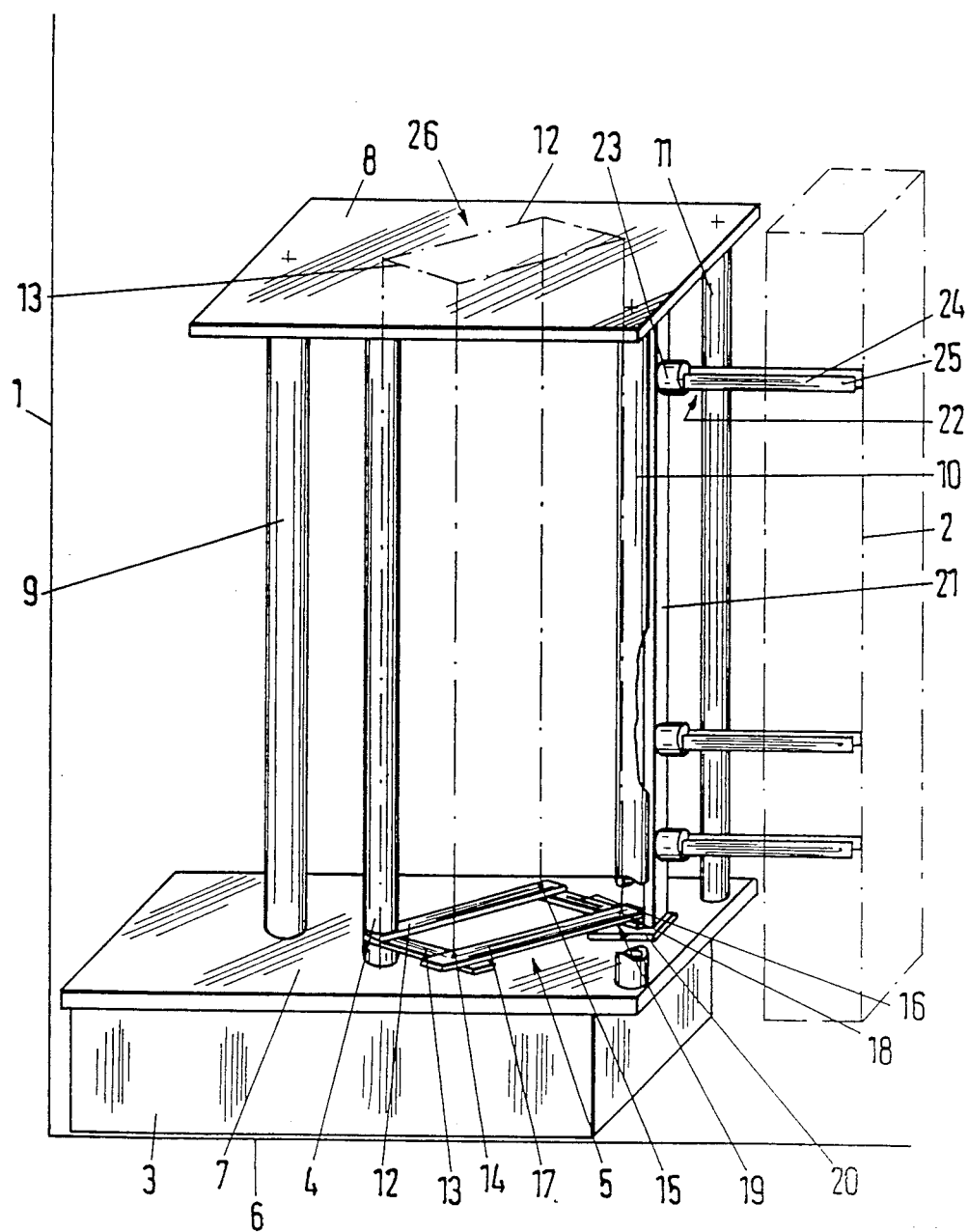

APPARATUS FOR THE INSPECTION OF A NUCLEAR REACTOR FUEL ASSEMBLY

The invention relates to an apparatus for the inspection of a nuclear reactor fuel assembly, including an ultrasonic test head being carried by a probe and being insertable into spaces between the fuel rods, an encapsulated housing which is disposed in a water-filled pool for accommodating a lever drive mechanism for the movement of the probe disposed outside the housing, and a rotary transmission passing through a wall of the housing, the rotary transmission having a lever linkage at an end thereof disposed outside the housing with a carrier for receiving the probe.

Such an apparatus is known from German Published, Non-Prosecuted Application DE-OS No. 33 37 084.

In the prior art device, the probe which is equipped with an ultrasonic test head is only to be inserted into the spaces between the fuel rods in one position, namely in the lower end region of the fuel assembly. For this purpose, the rotary trasmission passes through the underside of the housing which is level with the bottom end piece of the fuel assembly and carries the probe by means of a lever linkage. However, the operators of nuclear power plants are required to test the fuel rods for water inclusion, not only at one point but on several levels. It is admittedly known from German Published, Non-Prosecuted Application No. 34 19 765 to move a probe in the vertical direction in order to be able to successively test the fuel rods on several levels. In order to accomplish this, a drive system is necessary which permits the vertical movement of the probes over a fuel assembly length of approximately 4 meters. Apart from the elaborate drive, the vertical movement in the water-filled pool requires a great deal of time to be expended, which is further increased by the step-by-step testing on several levels. Since the testing of the fuel assemblies only takes place with the reactor shut down, the test time reduces the time that the nuclear power plant is available.

It is accordingly an object of the invention to provide an apparatus for the inspection of a nuclear reactor fuel assembly, which overcomes the hereinafore-mentioned disadvantages of the heretofore-known devices of this general type and which permits simultaneous testing on several levels with a reduced amount of time expended.

With the foregoing and other objects in view there is provided, in accordance with the invention, an apparatus for the inspection of a nuclear reactor fuel assembly in a water-filled pool having fuel rods with spaces therebetween, comprising an encapsulated housing having walls and being disposed in the water-filled pool, a lever drive mechanism disposed in the housing, a rotary transmission being connected to the lever drive mechanism and extending through one of the walls of the housing toward the surface of water in the pool, a plurality of stationarily disposed lever linkages jutting out from the rotary transmission outside the housing, each of the lever linkages having an end facing away from the rotary transmission, carriers each being connected to a respective one of the ends of the lever linkages, probes each being disposed on a respective one of the carriers, and ultrasonic test heads each being disposed on a respective one of the probes for insertion into the spaces between the fuel rods.

The use of several probes permits the simultaneous testing of the fuel assembly on various levels. A time-consuming movement of one probe in the vertical direction is not necessary in order to allow testing successively on various levels.

In accordance with another feature of the invention, the carriers are carrying plates, and there is provided a tie bar carrying the probes and interconnecting the carrying plates. This structure permits operation with two lever linkages. However, more than two probes can be attached to the tie bar.

In accordance with a concomitant feature of the invention, the rotary transmission has an end facing away from the housing, and there is provided a cover plate in which the end of the rotary transmission is guided, and struts connected between the cover plate and the housing. The additional guidance provides a stabilized construction of the apparatus.

Other features which are considered as characteristic for the invention are set forth in the appended claims.

Although the invention is illustrated and described herein as embodied in an apparatus for the inspection of a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The FIGURE of the drawing is a diagrammatic, partly broken-away perspective view of an apparatus according to the invention.

Referring now to the single FIGURE of the drawing in detail, it is seen that the apparatus is disposed on a non-illustrated support in a water-filled pool or pit 1. A fuel assembly 2, which is indicated by phantom lines and is formed of a plurality of longitudinally extending fuel rods, is held in a precise position relative to the apparatus, as a rule on the same support. A water-tight encapsulated housing 3 contains a lever drive mechanism known from German Published, Non-Prosected Application DE-OS No. 33 37 084. A rotary transmission 4, which ensures the translation of the movement of the lever drive mechanism to a lever linkage disposed outside the housing 3, extends through a wall 7 of the housing 3 opposite the bottom 6 of the pool 1.

The region of the rotary transmission 4 protruding out of the housing is approximately four meters long and is approximately as long as a fuel assembly to be tested. Mirror-symmetrical lever linkages 5, 26 are disposed on the rotary transmission 4, both in the vicinity of the wall 7 and in the vicinity of the free end of the rotary transmission. In order to stabilize the rotary transmission, the free end thereof is guided in a cover plate 8 which is connected to the housing 3 by three struts 9, 10 and 11. Each respective lever linkage 5, 26 has bars 12, 13 which articulate with the rotary linkage, bars 16, 17, hinge joints 14, 15 connecting the bars 12, 13 to the bars 16, 17 and a pivot point 18 of the bars 16, 17. The movement of the bars 12, 13 is transferred through the hinge joints 14, 15 and the bars 16, 17 to the pivot point 18. A bolt 19 passing through the pivot point 18 is rotatably mounted in carrying plates 20 which are connected to the lever linkage 5, 26. A tie bar 21 extends between and is fixed to the carrying plates 20 and thus follows the movement of the lever linkages 5, 6. The tie bar 21 carries probes 22 at various levels, which jut out approximately at right angles from the tie bar. A probe 22 is formed of a holder 23 detachably fixed to the tie bar 21 and two fingers 24 which carry an ultrasonic test head 25 at the free ends thereof. The use of a tie bar permits the apparatus to operate with only two lever linkages, although the tie bar can carry more than two probes.

According to another embodiment of the invention, a quantity of lever linkages equal to the required number of probes can jut out from the rotary transmission 4. Each lever linkage then carries a probe, so that the tie bar 21 can be eliminated.

The fuel rods are tested simultaneously on three levels by a single traveling movement into the spaces between the fuel rods. Therefore, a probe movement in the direction of the longitudinal extent of the fuel assembly is not necessary.

The foregoing is a description corresponding in substance to German Application P No. 36 32 061.7, dated Sept. 20, 1986, the International priority of which is being claimed for the instant application, and which is hereby made part of this application. Any material discrepancies between the foregoing specification and the aforementioned corresponding German application are to be resolved in favor of the latter.

We claim:

1. In a water-filled pool having a nuclear reactor fuel assembly therein, the nuclear reactor fuel assembly having fuel rods with spaces therebetween, an apparatus for the inspection of the nuclear reactor fuel assembly, the apparatus comprising a dive housing having walls, a rotary transmission extending through one of said walls of said housing toward the surface of water in the pool, two vertically spaced apart lever linkages jutting out from said rotary transmission, each of said lever linkages having an end facing away from said rotary transmission, carrying plates each being connected to a respective one of said ends of said lever linkages, a tie bar interconnecting said carrying plates, and probes being disposed at a plurality of vertical levels along said tie bar for simultaneously moving laterally into a space between two of the fuel rods.

2. Apparatus according to claim 1, wherein said rotary transmission has an end facing away from said housing, and including a cover plate in which said end of said rotary transmission is guided, and struts connected between said cover plate and said housing.

* * * * *